April 30, 1963     N. J. CROCKER     3,087,450
MANUFACTURE OF TRANSISTORS

Filed March 16, 1960     2 Sheets-Sheet 1

INVENTOR
NORMAN J. CROCKER

ATTORNEY

April 30, 1963  N. J. CROCKER  3,087,450
MANUFACTURE OF TRANSISTORS
Filed March 16, 1960  2 Sheets-Sheet 2

INVENTOR
NORMAN J. CROCKER
ATTORNEY

United States Patent Office 3,087,450
Patented Apr. 30, 1963

3,087,450
MANUFACTURE OF TRANSISTORS
Norman Joseph Crocker, Enfield, England, assignor to Associated Electrical Industries Limited, London, England, a British company
Filed Mar. 16, 1960, Ser. No. 15,439
Claims priority, application Great Britain Mar. 18, 1959
4 Claims. (Cl. 113—99)

This invention relates to the manufacture of transistors. It is concerned with junction transistors manufactured by alloying pellets of donor or acceptor material to opposite faces of a wafer of semi-conductor material. P-n junctions are formed where the alloying occurs and ohmic connections are made to the wafer and the two pellets to provide the base emitter and collector electrodes respectively.

It is an object of the present invention to provide apparatus for use in manufacturing such transistors.

According to the present invention apparatus for manufacturing transistors comprises a block containing one or more cavities and lower and upper jigs adapted to fit snugly within said cavities and both jigs when so fitted providing parallel facing surfaces between which a semi-conductor wafer can be positioned, the lower jig having a recess in its facing surface and the upper jig having a hole extending therethrough to its facing surface, said recess and said hole being adapted to receive a pellet of material forming the respective electrodes of a transistor and position said pellets in contact with opposite faces of a semi-conductor wafer positioned between the jigs.

The block provides a convenient means of holding the wafer and the pellets in contact with each other and when loaded the block is transferred to an alloying oven in which the temperature is raised sufficiently to cause the pellets to be alloyed to the wafer to form a p-n junction of the transistor.

In carrying out the invention a block may contain a plurality of such cavities to enable a number of transistors to be formed at the same time.

In order that the invention may be more fully understood reference will now be made to the accompanying drawings in which.

Figure 1:
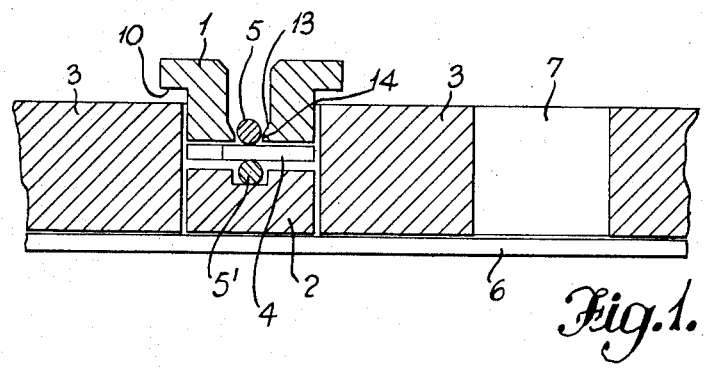
FIG. 1 shows an embodiment of the invention.

Referring now to FIG. 1 there is shown therein a cross-section through part of a stainless steel block 3 having a series of parallel cavities 7, two of which are shown. Cavities 7 may be drilled through the block 3, in which case block 3 rests on a stainless steel strip 6, or they may be blind as if strip 6 were integral with the bar 3.

Cavities 7 accommodate snugly fitting an upper jig 1 and a lower jig 2 of artificial ruby or similar refractory material. Jig 1 has a through hole, jig 2 a blind hole or recess as shown.

In use, an indium pellet 5' is placed in the blind hole of 2, a germanium wafer 4 is laid on the indium pellet, jig 1 placed in position above wafer 4 and finally an indium pellet 5 is inserted in the hole in 1. The other cavities in the bar are similarly loaded. The diameters of cavities 7 are of course slightly larger than the diagonal dimension of a germanium wafer.

Block 3 with plate 6 held in position is then transferred to an alloying oven and subjected to a heating cycle so that the indium pellets are melted and alloyed to the germanium wafers.

Figure 2:
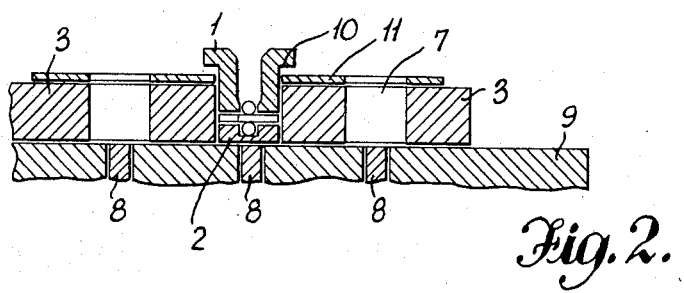
FIGS. 2 and 3 show a further embodiment in elevation and plan respectively.
Figure 3:
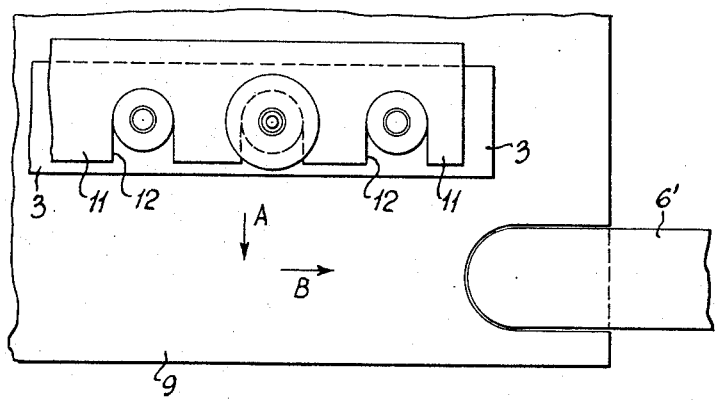

With slight modifications to the equipment as shown in FIG. 2 and FIG. 3 the loading of the indium pellets and germanium wafers can be much facilitated. The additional features are the series of plungers 8 aligned under cavities 7 in the block 3 and sliding in bores in a base plate 9, and a comb-like bar 11 in which cutouts 12 are provided corresponding with the positions of cavities 7. The cut-outs 12 are designed to accommodate the body of jig 1 with the edges of cut-outs 12 each engaging a flange 10 of jig 1.

Means are provided for raising and lowering plungers 8 and bar 11. Conveniently 9 is the top surface of a metal box which contains the actuating mechanism for plungers 8 and bar 11 and which is fitted with two levers for raising and lowering 8 and 11 respectively. Each lever should have two positions. In one position of the plunger lever controlling the plungers the tops of plungers 8 should be flush with the surface 9 and in the other the plungers should project into cavities 7 so that the top surface of lower jig 2 resting on a plunger should be flush with or preferably slightly below the top surface of block 3. In one position of the lever operating bar 11, a top-jig 1 fitted in 11 should be in position in cavity 7 as shown and in the other position the bottom of 1 should be well clear of the block 3.

The method of loading is as follows. Plungers 8 are set in the upper position and cavities 7 loaded with lower jigs 2. Indium pellets are then placed in the lower jigs and germanium wafers placed in position. It may be necessary slightly to lower the plungers here so that the wafers may be inserted in cavities 7. Bar 11 is next loaded with upper jigs 1 and lowered to introduce the jigs into the hole 7 following which indium pellets are inserted in the holes in jigs 1.

Finally block 3 is slid away from the comb 11 in direction A so as to disengage the jigs 1 and then in direction B onto the base strip 6'. End of 6' conveniently rests in a depression formed in surface 9 so that this surface and the top surface of 6' are flush. The loaded block 3 and base strip 6 are then transferred to the alloying oven as before.

Figure 4:
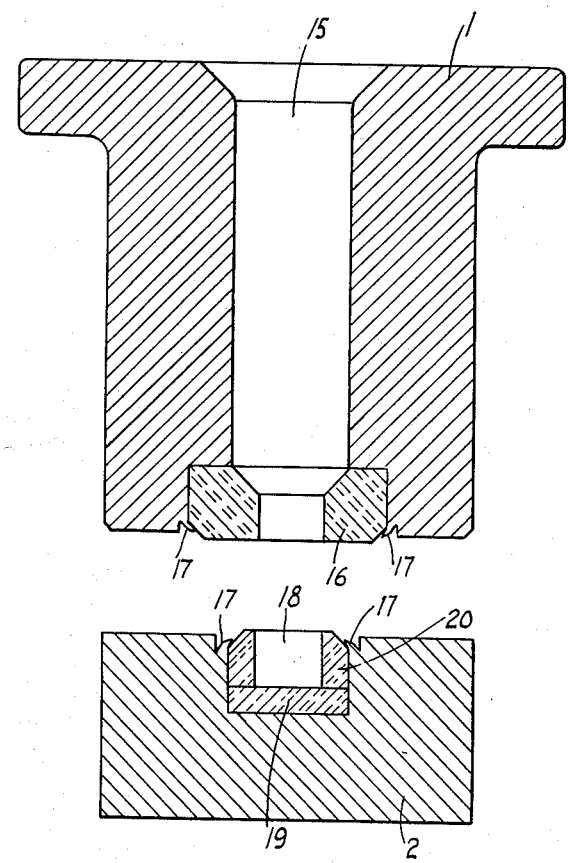
FIG. 4 shows an alternative construction of the jigs.

An alternative construction of the jigs is shown in FIG. 4. In this construction both the upper jig 1 and the lower jig 2 are formed of stainless steel and in each of the jigs an artificial ruby insert is provided over the area where the jigs contact the semi-conductor wafer. In the case of upper jig 1 an artificial ruby insert 16 in the form of a collar surrounding the end of the central hole 15 of the jig is arranged so that its outer surface is slightly proud of the lower surface of the jig. To secure the insert in the jig the jig is provided with a flange 17 which after the positioning of insert 16 in the jig is spun down to secure the insert.

In the case of lower jig 2 its recess 18 is lined by means of an artificial ruby plate 19 in the base of the recess and an artificial ruby collar 20 lining the walls of the recess, which collar is secured to the jig 2 in like manner to the method of securing insert 16 to jig 1.

The advantage of utilising the above apparatus is that the alloying of both the pellets to a wafer is done in one heating cycle and the size of the alloyed area can be accurately controlled so that transistors having relatively uniform characteristics are produced.

What I claim is:

1. Apparatus for manufacturing transistors comprising a block containing a plurality of cavities, lower and upper jigs adapted to fit snugly within said cavities and both jigs when so fitted providing parallel facing surfaces between which a semi-conductor wafer can be positioned, the lower jigs having recesses in their facing surfaces adapted to receive pellets of material forming one electrode of a transistor and the upper jigs having interior walls defining holes extending through said upper jigs to the facing surfaces thereof adapted to receive pellets of material forming the other electrode of a transistor, the two pellets when provided contacting opposite faces of a semi-conductor wafer when in position between said facing surfaces of an upper and lower jig, a bar having a plurality of comb-like cutouts spaced apart to coincide with the cavities of said block and circumferential lips provided on said upper jigs arranged to fit in said cut-outs to enable all the upper jigs to be carried by said bar, said bar being interposed between the block and the said circumferential lips on the upper jigs.

2. Apparatus for manufacturing transistors comprising a block containing a plurality of cavities, lower and upper jigs adapted to fit snugly within said cavities and both jigs when so fitted providing parallel facing surfaces below the level of the top surface of the block between which a semi-conductor wafer can be positioned, the lower jigs having recesses in their facing surfaces adapted to receive pellets of material forming one electrode of a transistor and the upper jigs having interior walls defining holes extending through said upper jigs to the facing surfaces thereof adapted to receive pellets of material forming the other electrode of a transistor, the two pellets when provided contacting opposite faces of a semi-conductor wafer when in position between said facing surfaces of an upper and lower jig, and a bar having a plurality of comb-like cut-outs spaced apart to coincide with the cavities of said block, circumferential lips provided on said upper jigs arranged to fit in said cut-outs to enable all the upper jigs to be carried by said bar, a base plate for supporting said block, said base plate having a pluraltiy of vertically movable plungers spaced apart to coincide with said cavities to raise the lower jigs to higher levels within the cavities for loading the recesses of the jigs.

3. Apparatus for manufacturing transistors comprising a block containing at least one cavity, lower and upper jigs adapted to fit snugly within said cavity and both jigs when so fitted providing parallel facing surfaces, below the level of the top surface of the block, between which a semi-conductor wafer can be positioned, the lower jig having a recess in its facing surface adapted to receive a pellet of material forming one electrode of the transistor and the upper jig having interior walls defining a hole extending through said upper jig to the facing surface thereof adapted to receive a pellet of material forming the other electrode of the transistor, the two pellets when provided contacting opposite faces of a semi-conductor wafer when in position between said facing surfaces of said upper and lower jig, and a plunger movable vertically through the cavity to raise the lower jig to a higher level within the cavity for loading the recess thereof.

4. Apparatus for the manufacture of transistors comprising a carrier block of stainless steel formed with a plurality of through holes extending from an upper face to a lower face of the block, a carrier plate on which the carrier block can be placed and which then obstructs the bottoms of the said through holes, separate refractory lower jigs of a height less than the thickness of the carrier block and arranged to fit freely in the lower parts of the holes in the carrier block, separate refractory upper jigs arranged to fit freely in the upper parts of the holes in the carrier block, each of the lower jigs being provided in its upper surface wtih a blind hole adapted to receive a pellet of material forming one electrode of a transistor and each of the upper jigs being provided with a through hole adapted to receive a pellet of material forming another of the electrodes of the transistor, and said carrier plate provided with vertically movable plungers spaced to correspond with the spacing of the holes in the carrier block and operative to move the lower jigs upwardly for ease in loading pellets into the blind holes in the lower jigs.

References Cited in the file of this patent

UNITED STATES PATENTS

| | | |
|---|---|---|
| 2,409,357 | Jackson | Oct. 15, 1946 |
| 2,441,346 | Currivan | May 11, 1948 |
| 2,634,696 | Farmanian et al. | Apr. 14, 1953 |
| 2,804,581 | Lichtgarn | Aug. 27, 1957 |
| 2,859,720 | Palmer et al. | Nov. 11, 1958 |
| 2,862,470 | Williams | Dec. 2, 1958 |
| 2,939,204 | Knott et al. | June 7, 1960 |
| 2,939,205 | Sutherland et al. | June 7, 1960 |
| 2,942,568 | Hamilton et al. | June 28, 1960 |
| 2,977,257 | Lynch et al. | Mar. 26, 1961 |
| 2,981,875 | Kelly et al. | Apr. 25, 1961 |

FOREIGN PATENTS

| | | |
|---|---|---|
| 797,304 | Great Britain | July 2, 1958 |